United States Patent [19]

Dasch et al.

[11] Patent Number: 5,243,594
[45] Date of Patent: Sep. 7, 1993

[54] METHOD FOR TRANSMITTING MESSAGE BLOCKS BETWEEN TRANSMISSION LINES OF A TELECOMMUNICATION PROCESSOR SYSTEM ASSIGNED TO ONE ANOTHER IN EXISTING CONNECTIONS

[75] Inventors: Bernd Dasch, Lochham; Robert Naessl, Kottgeisering, both of Fed. Rep. of Germany

[73] Assignee: Siemens Aktiengesellschaft, Munich, Fed. Rep. of Germany

[21] Appl. No.: 754,618

[22] Filed: Sep. 4, 1991

[30] Foreign Application Priority Data

Sep. 4, 1990 [DE] Fed. Rep. of Germany ....... 4028014

[51] Int. Cl.$^5$ .............................................. H04L 12/54
[52] U.S. Cl. ......................................... 370/61; 370/60; 370/79
[58] Field of Search ................................ 370/60, 61, 79

[56] References Cited

U.S. PATENT DOCUMENTS

| | | | |
|---|---|---|---|
| 4,475,192 | 10/1984 | Fernow et al. | 370/60 X |
| 4,839,891 | 6/1989 | Kobayashi et al. | 370/60 X |
| 5,014,265 | 5/1991 | Hahne et al. | 370/61 X |
| 5,018,059 | 5/1991 | Kerschner et al. | 379/269 X |

FOREIGN PATENT DOCUMENTS 0160300 11/1985 European Pat. Off. .

Primary Examiner—Douglas W. Olms
Assistant Examiner—Russell Blum
Attorney, Agent, or Firm—Hill, Steadman & Simpson

[57] ABSTRACT

A method for transmitting message blocks between transmission lines of a communication processor including those transmission lines being allocated to one another in existing connections involves, in a communication processor system, line connecting units connected with the transmission lines which are to be connected to a plurality of switching processors via at least one internal bus system. In conjunction with existing connections, a flow control provides for the transmission of message blocks between the line connecting units and the switching processors. This cause, given a momentary overload of one of the switching processors, or one of the outgoing transmission lines, only those message blocks determined for a particular switching processor or those for the outgoing transmission lines are temporarily put on hold for a transmission.

4 Claims, 2 Drawing Sheets

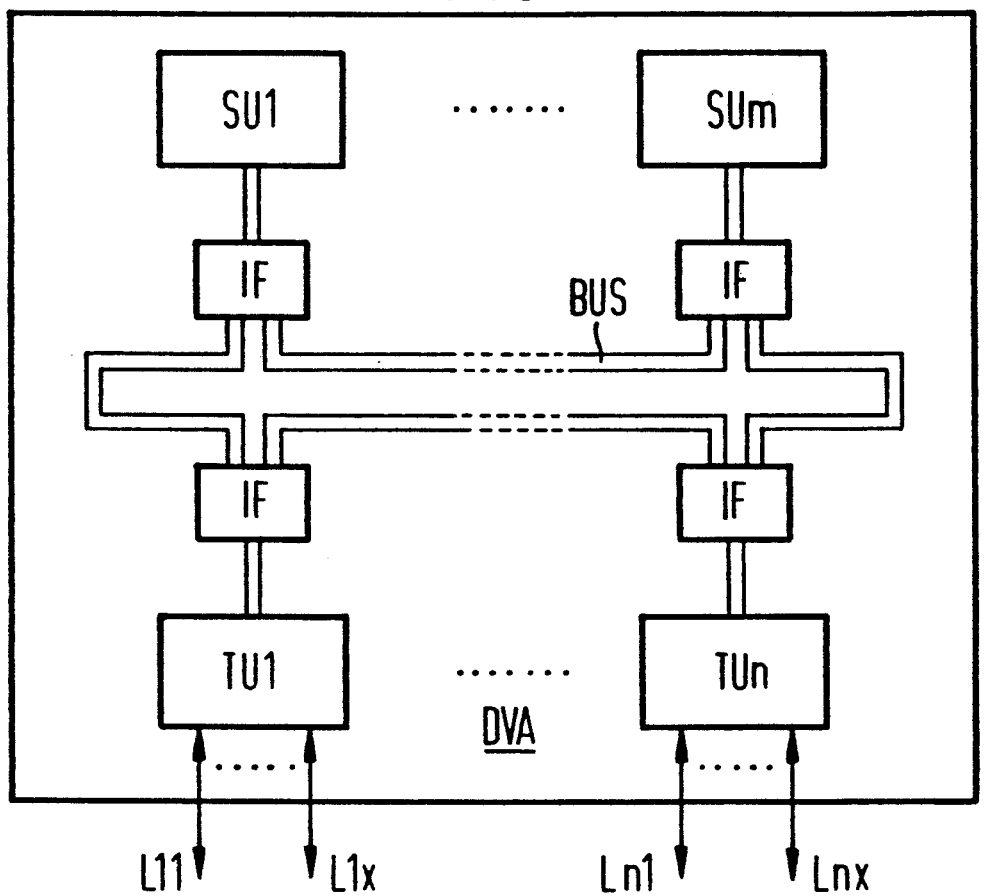
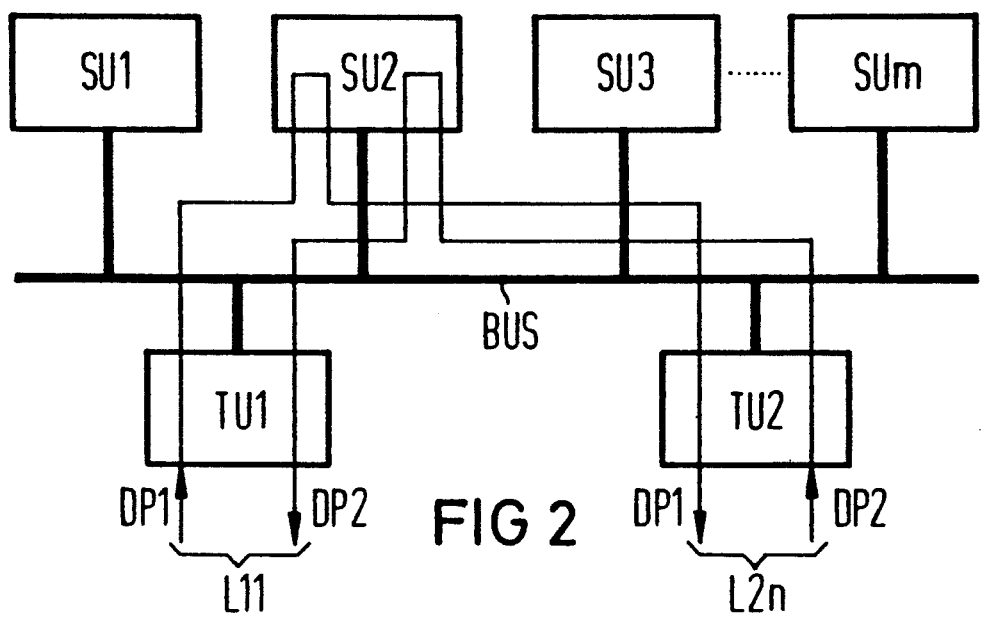

METHOD FOR TRANSMITTING MESSAGE BLOCKS BETWEEN TRANSMISSION LINES OF A TELECOMMUNICATION PROCESSOR SYSTEM ASSIGNED TO ONE ANOTHER IN EXISTING CONNECTIONS

BACKGROUND OF THE INVENTION

1. Field of the Invention

The present invention relates to a method for transmitting message blocks between transmission lines of a communication processor or computer system. The method is more particularly concerned with a data switching system in which transmission lines are assigned to one another in existing connections, in which line connecting units connected with the transmission lines are connected via at least one internal system bus to a plurality of switching processors and thereby one of the switching processors, as well as at least one of the line connecting units, are integrated in the transmission of internal message blocks which correspond to those message blocks occurring in conjunction with an existing connection on the transmission lines, and more particularly a method for transmitting message blocks between transmission lines of a computer or processor system, particularly of a data switching system, in which those transmission lines assigned to one another in existing connections, in which line connecting units connected with the transmission lines are connected via at least one internal system bus to a plurality of switching processors, are employed, and thereby one of the switching processors, as well as at least one of the line connecting units are integrated in the transmission of internal message blocks which correspond to those message blocks occurring in conjunction with an existing connection on the transmission lines is the general structure.

2. Description of the Prior Art

A modularly-structured communication computer or processor system is already known from the European patent application 0 160 300, fully incorporated herein by this reference, whereby line connecting units connected to transmission lines are jointly connected to a ring system bus with a plurality of switching processors. A connection thereby usually consists of two line connecting units, namely that one connected with the incoming transmission line and that one connected with the outgoing transmission line, as well as of two of the switching processors. After the connection set up, the transmission of message blocks between the transmission lines integrated in the respective connection occurs merely under the control of one of the switching processors participating in the connection setup. The remaining switching processors serve as a back-up unit in order to take over when the first-mentioned switching processor fails. No further information regarding the control of the transmission of message blocks in existing connections within the communication computer or processor system is disclosed in the known method.

SUMMARY OF THE INVENTION

It is the object of the present invention to provide a method in which it is possible to perform a flow control in the transmission of message blocks to prevent overload situations within the communication computer or processor system in a transmission system of the type basically set forth above.

The above object is achieved and the foregoing problem is solved in a communication system of the type set forth above which is particularly characterized in that, from the line connecting units, accepting message blocks from respective internal message blocks which are transmitted at first continuously, i.e. with an open window size $W = \infty$ to one switching processor that is possible for the respective connection, and are there inserted in a transmission queue, in that upon reaching a stipulated filling ratio of such a transmission queue, the transmission of internal message blocks to the respective switching processor is interrupted for a stipulated time interval, and the internal message blocks that are therefore at first not transmittable are inserted in a setback queue which has been setup individually for the respective switching processor in response to the interruption, in that after the termination of the stipulated time interval, the transmission of internal message blocks to the respective switching processor is undertaken again first, considering those internal message blocks that were inserted in the previously established set back queue, in that from the switching processors, respectively, those internal message blocks priorly inserted in the appertaining transmission queue are transmitted at first with an open window size ($W = \infty$ possible for the respective connection, and are there inserted into one of the line queues individually assigned to the transmission line which is possible for the respective connection, in that, upon surpassing of a stipulated first filling ratio of such a line queue, at least until the ratio is transgressed downwardly again, whose internal message blocks to be inserted into this line queue are transmitted to the respective line connecting unit only with a window size $W = 1$, and in that upon reaching a stipulated second filling ratio of such a line queue lying above the first filling ratio, however, the transmission of internal message blocks to be inserted in this line queue is interrupted by the respective switching processor and the, therefore, at first not-transmittable internal message blocks are inserted in a set back queue individually set up for the respective transmission line in response to the interruption, and in that only after the termination of a stipulated time interval, the transmission of internal message blocks to be inserted in the respective line queue is taken up again by the respective switching processor, first considering those internal message blocks that were inserted in the priorly-established set back queue.

Also, according to the invention, the method is particularly characterized in that, from the line connecting units accepting message blocks, respectively internal message blocks, are transmitted at first continuously, i.e. with open window size $W = \infty$, to one switching processor that is possible for the respective connection, and are there inserted in a transmission queue, in that upon reaching a stipulated filling ratio of such a transmission queue, the transmission of internal message blocks to the respective switching processor is interrupted for a stipulated time interval, and the internal message blocks that are therefore at first not-transmittable are inserted in a setback queue which has been set up individually for the respective switching processor in response to the interruption, in that from the switching processors respective internal message blocks are transmitted at first continuously, i.e. with an open window size $W = \infty$ to a line connecting unit possible for the respective connection, and are there inserted in a reception queue corresponding to the priorly-mentioned transmission queue, in that upon reaching a stipulated filling ratio of such a reception queue, the transmission of internal message blocks to the respective line connecting unit is interrupted for the mentioned stipulated time interval and the therefore, at first non-transmittable internal message blocks, are inserted in a setback queue individually set up for the respective line connecting unit in response to the interruption, and in that, after the termination of the stipulated time interval, the transmission of internal message blocks to the respective switching processor or to the respective line connecting unit, is taken up again, first considering those internal message blocks that were inserted in the priorly-established set back queue.

The present invention offers the advantage that the flow control measures provided for the prevention of overload situations in the individual switching processors or line connecting units only acts locally, i.e. when a momentary overload occurs in one of the switching processors only those conditions controlled thereby are included in the flow control, or when a momentary overload occurs in the course of the forwarding of message blocks via one other line connecting units or, respectively, one of the transmission lines, only those connections being processed via the structures are included in the flow control. The transmission of message blocks in connection with other connections, however, occurs in an unimpeded manner.

Another advantage of the present invention is that only when overload situations occur, operating devices in the form of one or several setback queues are needed temporarily for a corresponding flow control.

Advantageous embodiments of the invention result from specific structural realizations.

First of all, a feature is provided in which the methods are particularly characterized in that a ring system bus is used as an internal system bus in which each circulating internal message blocks is taken over by a switching processor which is possible as a receiver, or respectively, by a line connecting unit which is possible as a receiver. In its place, a ring acknowledgment is transmitted to that line connecting unit or to that switching processor of which the just-accepted internal message block has been previously released. Once the stipulated filling ratio of the transmission queue assigned to a switching processor has been reached, the respective switching processor rejects an internal message block to be accepted thereby with a ring acknowledgment of a stipulated coding. In response to such a ring acknowledgment, the possible line connecting unit, on the one hand, interrupts the transmission of internal message blocks to the respective switching processor and, on the other hand, the previously-rejected internal message block, as well as those internal message blocks possibly following thereon and to be accepted by the same switching processor, are inserted in the setback queue established for this switching processor. From the line connecting units, however, in response to the taking over of an internal message block, the momentary condition of the possible line queue and therefore possibly the rejection of the just taken-over internal message block is indicated to the respective switching processor by a signaling block transmitted separately via the ring system bus. In response to receiving such a signaling block, the respective switching processor, depending on the information contained in the respective signaling block, either continues the transmission of internal message blocks to be inserted in the possible line queues with open window size or with the window size W=1 or interrupts the same, and in the case of the latter, the internal message block rejected by the just-received signaling block, possibly together with internal message blocks following thereon, and to be inserted in the same line queue, is inserted in the setback queue established in response to the interruption.

According to another feature of the invention, the above method is particularly characterized in that a ring system bus is used as an internal bus in which each circulating internal message block is taken over by a switching processor which is found possible as a receiver, or respectively, by a line connecting unit which has also been found possible as a receiver, and in its place a ring acknowledgment is transmitted to that line connecting unit or to that switching processor of which the just-accepted internal message block has been previously released. Once the stipulated filling ratio of the transmission queue assigned to a switching processor has been reached, the respective switching processor rejects an internal message block to be accepted thereby with a ring acknowledgment of a stipulated coding. In response to such a ring acknowledgment, the possible connecting line unit, on the one hand, interrupts the transmission of internal message blocks to the respective switching processor and, on the other hand, the previously-rejected internal message block, as well as those internal message blocks possibly following thereon and to be accepted by the same switching processor, are inserted in the setback queue established for this switching processor. Once the stipulated filling ratio of the reception queue pertaining to a line connection unit has been reached, the respective line connecting unit rejects an internal message block to be accepted thereby with a ring acknowledgment corresponding to the previously-mentioned ring acknowledgment of stipulated coding. In response to the acceptance of such a ring acknowledgment, the possible switching processor, on the one hand, interrupts the transmission of message blocks to the respective line connecting unit, and, on the other hand, the previously-rejected internal message block, as well as internal message blocks following thereon and to be accepted by the same line connecting unit, are inserted in the setback queue established for this line connecting unit.

The advantage of the foregoing features and embodiments of the invention is the relatively low control effort for the transmission of signals serving for the flow control between the line connecting units and the switching processors.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block diagram representation of a modularly-structured communication processor system in which the invention is applied;

FIG. 2 is a block diagram representation illustrating the events in the transmission of message signals in connection with existing connections;

DESCRIPTION OF THE PREFERRED EMBODIMENTS

Figure 3:
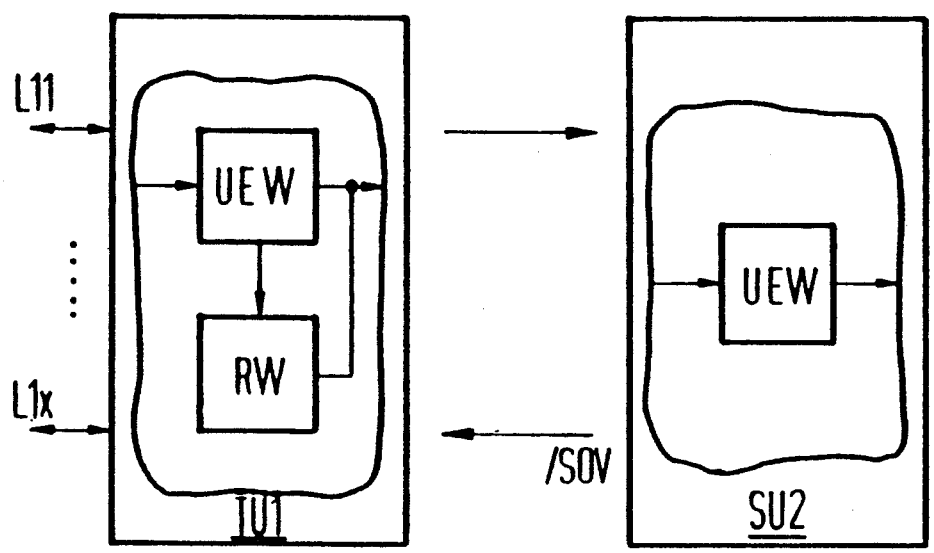
FIG. 3 is a basic block diagram representation of a control event taking place during flow control.

FIG. 1 illustrates in a block diagram form a modularly-structured communication processor system DVA which may be a data switching system, for example. This data switching system has a plurality of line connecting units TU1-TUn with which, respectively, a plurality of transmission lines L11, . . . , L1x or Ln1, . . . , Lnx is connected. These transmission lines can be operated in a bidirectional manner, for example.

Also part of the line connecting unit shown in FIG. 1 is a separate respective interface unit IF. By way of these interface units IF, the line connecting units reside in a ring system bus BUS, which permits, in particular, to transmit signals only in one transmission direction and which can be composed of, for example, a plurality of single lines by way of which signals are transmitted in a parallel fashion. Apart from the just-mentioned interface units, more interface units IF are located in the ring system bus BUS which pertain to switching processors SU1-SUm. The line connecting units TU and the switching processors SU thereby respectively represent a microprocessor arrangement.

As results from the initially-mentioned European patent application 0 160 300, the operation of the data switching system shown in FIG. 1 can be managed such that each line connecting unit TU1-TUn is assigned to one of the switching processors SU1-SUm. For that purpose, memories exist in the individual line connecting units, as well as in the individual switching processor, in which the respective assignments are recorded. In the memory of the line connecting unit TU1, for example, the address of the switching processor SU1 can be stored. In the memory of the switching processor SU1, the address of the line connecting unit TU1 can be stored, regarding the transmission lines L11-L1x connected with the line connecting unit TU1. In the memories of the switching processors SU1-SUm, furthermore, information is stored concerning which switching processor is assigned to the respective other transmission line or line connecting units. This means that, basically, each of the switching processors SU serves one of the line connecting units TU1-TUn and, otherwise, contains information concerning corresponding allocations regarding each one of the other switching processors SU. Moreover, each of the switching processors SU can be assigned one of the other switching processors as a backup unit in order to take over in case the first-mentioned switching processor fails.

The above-cited European patent application 0 160 300 furthermore discusses that the set up of a connection which can be a virtual connection, for example, usually involves two line connecting units, namely that line connecting unit connecting with the incoming transmission line and that line connecting unit connected with the outgoing transmission line, as well as two switching processors assigned thereto. The set up of such a virtual connection can occur, for example, corresponding to the CCITT recommendation X.25 or X.75, depending on whether the transmission lines are transmission lines connected to subscriber equipment or transmission lines by way of which the data switching system of FIG. 1 is connected with another data switching system. The control events taking place in the individual line connecting units and switching processors in the set up of connections will not be discussed herein in more detail since such control events are not the subject matter of the present invention.

After the set up of the virtual connection, in the actual transmission phase, the transmission of message signals occurs block-by-block or packet-by-packet, only under the control of one of the processors priorly integrated in the connection setup. This can be that switching processor, for example, which is assigned to the line connecting unit connected with the incoming transmission line. Moreover, it should also be mentioned here that message signals generally refer to text signals, video signals or speech signals in digital form or other digital signals.

FIG. 2 illustrates the transmission of message blocks (data packets) in conjunction with existing connections with the example of the transmission of message blocks between two transmission lines. These two transmission lines, on the one hand, can involve the transmission line L11 connected to the line connecting unit TU1 and, on the other hand, the transmission line L2n connected to the line connecting unit TU2. According to FIG. 2, message blocks (data packets) DP1 accepted from the line connecting unit TU1 via the transmission line L11 are at first supplied to the switching processor SU2 via the ring system bus BUS. Depending on the information available thereto, this switching processor SU2 then transmits the message blocks just supplied thereto to the line connecting unit TU2 integrated in the virtual connection, the line connecting unit TU2, on its part, transmitting these message blocks to the transmission line L2n. In the corresponding manner, under the assumption that a bidirectional virtual connection exists between the two transmission lines, message blocks DP2 accepted by the transmission line L2n are, at first, transmitted to the first switching processor SU2 from the line connecting unit TU2 via the ring system bus BUS, and from there, via the ring system but BUS and the line connecting unit TU1 to the transmission line L11.

For the mentioned transmission of message blocks via the ring system bus BUS between the line connecting equipment and the assigned switching processor, a ring protocol is stipulated. According to that one, the message blocks occurring on the transmission lines L11 and L2n are inserted, for example, respectively in a defined frame, in the following, also called internal message block, in which, among others, a receive address identifying the unit selected as a receiver is provided, i.e. one of the switching processors SU1-SUm or one of the line connecting units TU1-TUn, as well as a send address identifying the unit releasing the respective message block as a sender are contained. Such an internal message block transmitted via the ring system bus BUS is taken over by the unit identified by the receive address (switching processor or line connecting unit) and acknowledged with a ring acknowledgment released by that unit. Instead of the previously taken-over internal message block, this ring acknowledgment is transmitted to the sender via the ring system bus BUS. The ring acknowledgment containing information regarding a successful or unsuccessful reception event can be added on to an internal message block already as a prearranged ring acknowledgment. Depending on the reception event, this prearranged ring acknowledgment is transmitted back, in modified form, to the unit identified by the send address contained in the just-received internal message block.

Figure 4:
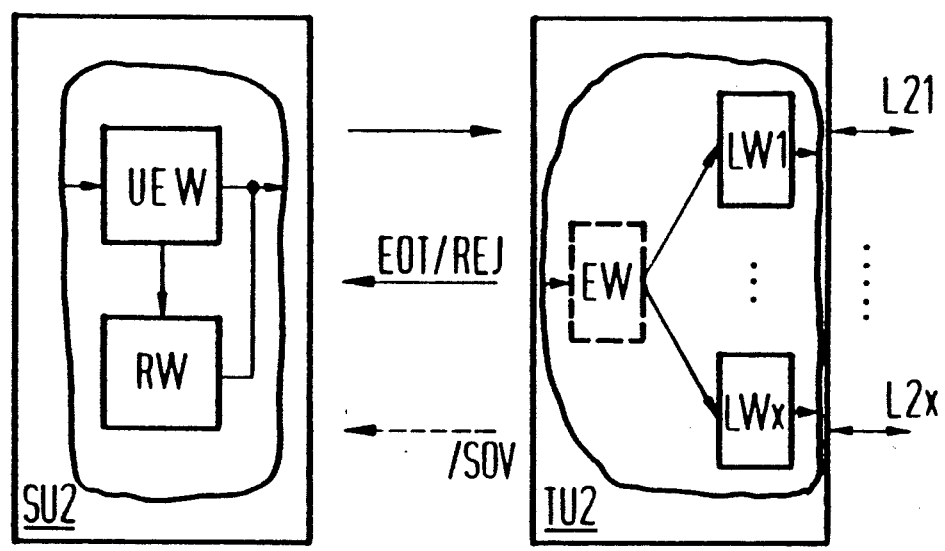
FIG. 4 is another basic block diagram representation of control events taking place during flow control.

FIGS. 3 and 4 illustrate details regarding the control events in the line connecting units TU1-TUn and the switching processors SU1–SUm during the transmission of internal message blocks. Based on the line connecting unit TU1 and the switching processor SU2, FIG. 3 illustrates the case wherein internal message blocks are to be forwarded from a line connecting unit to one of the switching processors. The internal message block corresponding to the message blocks occurring on the transmission lines of the line connecting unit TU1 are integrated, in successive fashion, into a transmission queue UEW. Copies of these internal message blocks are subsequently transmitted in the sequence of the integration of the internal message blocks to the respective possible switching processors, namely with an open window size $W = \infty$. In this case, this means a transmission to the switching processor SU2 occurs. The switching processor SU2 acknowledges the internal message blocks supplied thereto, respectively, with a previously-mentioned ring acknowledgment. Depending on whether the receiving event occurred without error or a transmission error exists, this ring acknowledgment is a positive or a negative ring acknowledgment. In the case of an error-free reception, i.e. when a positive ring acknowledgment is released, the respective received internal message block is inserted in a transmission queue UEW carried in the respective switching processor. When a transmission error exists, however, the just-received internal message block is rejected. A positive ring acknowledgment causes an internal message block of which previously a copy has been transmitted in the respective line connecting unit is now deconcatenated from the transmission queue. With this operation, the transmission event is terminated for the respective internal message block. When a negative ring acknowledgment is received, however, the same leads to a repeated transmission of the respective internal message block.

Once the transmission queue UEW carried in the switching processor SU2 reaches a stipulated filling ratio, the next-received internal message block is acknowledged with a specially-stipulated negative ring acknowledgment SOV by which a momentary overload is indicated. In response to receiving such a ring acknowledgment SOV, the line connecting unit TU1 reacts with an interruption of the transmission of internal message blocks to the switching processor SU2. Due to this interruption, a setback queue RW is temporarily established in the line connecting unit TU1 in which the internal message block rejected due to the ring acknowledgment SOV is inserted, as well as those internal message blocks to be transmitted to the switching processor SU2 following thereupon.

After a stipulated time interval, which lies, for example, in the millisecond-to second range, a new attempt is made from the line connecting unit TU1 to transmit internal message blocks to the switching processor SU2. If such a transmission is possible, first those internal message blocks are taken into account that were inserted into the setback queue RW in order to maintain the sequence of the internal message blocks to be transmitted to this switching processor. Those internal message blocks transmitted out of this setback queue are acknowledged in the previously-described manner and, possibly, deconcatenated from this setback queue.

The transmission events that were just set forth above in connection with the line connecting unit TU1 also repeat themselves in the other line connecting units so that in each line connecting unit from which internal message blocks are to be transmitted to the switching processor SU2 possibly a setback queue is established temporarily for the switching processor SU2 in the case of a momentary overload. Finally, the control events taking place in the switching processor SU2 repeat themselves also in the other switching processors. From this results that generally in the case of the occurrence of a momentary overload in one of the switching processors SU1–SUm in those line connecting units TU1–TUn from which internal message blocks are to be transmitted to the respective switching processor, respectively, a setback queue RW is established temporarily for the respective switching processor.

With the example of the switching processor SU2 and the line connecting unit TU2, FIG. 4 illustrates the case that internal message blocks previously inserted in the transmission queue UEW of a switching processor SU are to be transmitted to one or more line connecting units TU. Such a transmission also occurs, at first, with an open window size $W = \infty$ and an acknowledgment in the above specified manner.

Within the respective line connecting unit TU, here the line connecting unit TU2, the individual, received internal message blocks are then inserted in the line queues LW1–LWX which are individually assigned to the individual transmission lines connected to the respective line connecting unit TU. The acceptance of an internal message block in one of the line queues is indicated to the switching processor SU2 by a separately-transmitted signaling block EOT. In response to such a signaling block EOT, the switching processor SU then deconcatenates the respective internal message block from the transmission queue. When, in one of the line/system queues LW–LWx a stipulated first filling ratio is reached, it happens that in response to the next internal message block transmitted from the switching processor SU2 and to be inserted in the same line queue, the line connecting unit TU2 releases a signal block EOT with a special coding. Such a signaling block causes in the switching processor SU2 that the internal message blocks to be inserted in the respective line queue are now transmitted only with a window size $W = 1$. In other words, a transmission of one internal message block occurs only after the previously-released internal message block has been confirmed by a signaling block. The window size $W = 1$ is thereby kept until at least the stipulated first filling ratio of the possible line queue is again transgressed downwardly. In this manner, it is at first attempted to reduce the number of internal message blocks collected in this line queue, i.e. to forward message blocks corresponding to these internal message blocks via the possible transmission line.

When the case occurs that, despite the transmission of internal message blocks with the window size $W = 1$, the filling ratio of a line queue reaches a stipulated second filling ratio lying above the first filling ratio, it happens that in response to receiving an internal message block to be inserted in this line queue, the line connecting unit TU2 releases a signaling block REJ by which a momentary overload for the possible transmission line is indicated. In response to receiving a signaling block REJ, the switching processor SU2 reacts with an interruption of the transmission of internal message blocks designated for the respective transmission line. In response to this interruption, a setback queue RW is temporarily established in this switching processor into which the internal message block rejected due to the signaling block REJ is inserted, as well as internal message blocks following thereon, and likewise determined for the possible transmission line. After a time interval possibly deviating from the priorly-mentioned stipulated time interval, the switching processor SU2 then tries again to transmit internal message blocks determined for the momentarily-overloaded transmission line to the line connecting unit TU2. If this is possible, first those internal message blocks are considered that were inserted in the setback queue RW in order to keep the sequence of the message blocks designated for the possible transmission line. The internal message blocks at first inserted in the setback queues are likewise again acknowledged with a signaling block EOT and, possibly, deconcatenated from this setback queue.

Control events just explained in conjunction with the switching processor SU2 repeat themselves also in the other switching processors so that each switching processor SU1-SUm from which internal message blocks provided for a certain transmission line of the line connecting unit TU2 are to be released, possibly a window size of $W=1$ is considered in the above-specified manner for these internal message blocks or, respectively, these internal message blocks are inserted in a setback queue individually established for the possible transmission line. Finally, the previously-explained control events taking place in the line connecting unit TU2 also repeat themselves in the other line connecting units. From this results that, generally, in the case of the occurrence of a momentary overload in one line queue carried in the line connecting units TU1-TUn of those switching processors SU1-SUm of which internal message blocks determined for the momentary overloaded line queue are to be transmitted, a window size $W=1$ is stipulated and, if necessary, temporarily a setback queue is established for the possible transmission line.

Moreover it should be pointed out that the internal message blocks to be inserted in the individual line queues LW1-LWx of a line connecting unit can previously also run through a receive queue EW established in the respective line connecting unit. The acceptance of internal message blocks into such a receive queue EW can then occur in the manner already explained in connection with FIG. 3, i.e. when the stipulated filling ratio is reached by such a receipt queue, the respective line connecting unit releases a negative ring acknowledgment SOV, which causes, in the possible switching processor, the establishing of an individual setback queue for the respective line connecting unit. The flow control provided per individual lines explained with respect to FIG. 4 should, however, react before the flow control provided individually per line connecting unit.

Finally it should be pointed out that the above describes the flow control in the transmission of message blocks in conjunction with existing conditions using the example of a communication processor system fashioned as a ring system bus. The present invention, however, relates to a flow control that can be generally applied in telecommunication processor systems in which line connecting units are connected with a plurality of switching processors via at least one internal system bus.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for transmitting message blocks between transmission lines of a communication processor system, in which transmission lines are assigned to one another in existing connections, in which line connection units are connected via at least one internal bus system to a plurality of switching processors and thereby at least one switching processor and at least one of the line connecting units are integrated in a connection for the transmission of internal message blocks which correspond to those message blocks occurring in conjunction with an existing connection between an incoming transmission line and an outgoing transmission line, comprising the steps of:

receiving and accepting the internal message blocks from the line connecting unit which blocks are transmitted, at first, continuously, with an open window size of $W=\infty$ to a selected switching processor for a specific connection and inserting the message blocks in a transmission queue;

upon reaching a predetermined filling ratio of the transmission queue, interrupting the transmission of internal message blocks to said selected switching processor for a predetermined time interval;

in response to the interruption, establishing a set-back queue for said selected switching processor and inserting the internal message blocks first considered non-transmittable into the set-back queue established for said selected switching processor;

after the predetermined time interval, transmitting the internal message blocks placed in the set-back queue to said selected switching processor;

transmitting the internal message blocks from said transmission queue by said selected switching processor with an open window size of $W=\infty$ to the outgoing line connecting unit assigned to said outgoing transmission line and inserting the internal message blocks into a transmission queue for said outgoing transmission line;

after transgressing a predetermined first filling ratio, in the transmission queue of said outgoing transmission line, transmitting the internal message blocks for said outgoing transmission line from said selected switching processor to said outgoing line connecting unit with a window size of $W=1$;

upon reaching a predetermined second filling ratio in the transmission queue of said outgoing transmission line, above the predetermined first filling ratio, interrupting the transmission of internal message blocks for said outgoing transmission line by said selected switching processor and establishing a set-back queue and inserting the internal message blocks into said set-back queue for said outgoing transmission line; and after a stipulated time interval, transmitting the internal message blocks placed in the set-back queue for said outgoing transmission line from said selected switching processor to said outgoing line connecting unit.

2. The method of claim 1, and further comprising the steps of:

applying the internal message blocks to a ring system bus and receiving the internal message blocks by said selected switching processor or said outgoing line connecting unit, respectively, and transmitting for each of the internal message blocks just-received a first ring acknowledgment signal;

upon reaching the predetermined filling ratio for said transmission queue of said selected switching processor, rejecting an internal message block just-received and transmitting a second ring acknowledgment signal of a predetermined coding;

in response to the second ring acknowledgment signal, interrupting the transmission of the internal message blocks to said selected switching processor and inserting the internal message block previously-transmitted and internal message blocks following this internal message block into said set-back queue for said selected switching processor;

in response to taking over internal message blocks for said outgoing transmission line by said outgoing line connecting unit; and possibly rejecting an internal message block transmitting a signaling block containing information about the status of the transmission queue of said outgoing transmission line via the ring system bus to said selected switching processor, and in response to receiving such a signaling block, and the information in said signaling block, continuing the transmission of internal message blocks for said outgoing transmission line with a window size $W=\infty$ or $W=1$, or interrupting the transmission of internal message blocks for said outgoing transmission line, respectively; and in response to the interruption, inserting the internal message block just transmitted and internal message blocks following this internal message block for said outgoing transmission line into said set-back queue for said outgoing transmission line.

3. A method for transmitting message blocks between transmission lines of a communication processor system, particularly of a data switching system, in which those transmission lines are assigned to one another in existing connections, and in which line connecting units are connected with the transmission lines and are connected via at least one internal bus system to a plurality of switching processors, and thereby at least one of the switching processors, as well as at least one of the line connecting units are integrated in the transmission of internal message blocks which correspond to those message blocks occurring in conjunction with an existing connection on the transmission lines, comprising the steps of:

from the line connecting units, accepting message blocks transmitted at first continuously with an open window size of $W=\infty$ to a switching processor and inserting the internal message block into a transmission queue;

upon reaching a predetermined filling ratio of the transmission queue, interrupting the transmission of internal message blocks to that switching processor for a predetermined interval and inserting the internal message blocks that are not at first transmittable into a set-back queue set up for said switching processor in response to the interruption;

transmitting the internal message blocks from said transmission queue at first continuously with an open window size $W=\infty$ to a receiving line connecting unit and placing the transmitted internal message blocks into a reception queue corresponding to said transmission queue;

upon reaching a predetermined filling ratio of the reception queue, interrupting the transmission of internal message blocks for the predetermined time interval and placing a first, non-transmittable internal message block in a set-back queue for the respective receiving line connecting unit in response to the interruption; and after termination of the predetermined time interval, transmitting the internal message blocks queued in said set-back queue for said switching processor or said set-back queue for said receiving line connecting unit respectively to said switching processor or to said receiving line connecting unit, respectively.

4. The method of claim 3, and further comprising the steps of:

circulating the internal message blocks in a ring bus as an internal bus system;

receiving a message block;

transmitting an acknowledgment signal to the transmitting unit;

upon reaching the predetermined filling ratio for the transmission queue said switching processor rejecting an internal message block with a specific ring acknowledgment signal having a specific code;

in response to the specific ring acknowledgment signal, interrupting the transmission of message blocks to said switching processor and inserting the message blocks for said switching processor into a set-back queue for that switching processor;

upon reaching a predetermined filling ratio for said reception queue of said receiving line connecting unit, rejecting an internal message block with the specific ring acknowledgment signal; and in response to acceptance of the specific ring acknowledgment signal by said switching processor, interrupting the transmission of message blocks to said receiving line connecting unit and inserting the internal message block previously-transmitted and internal message blocks following thereupon into said set-back queue for said receiving line connecting unit.

* * * * *